United States Patent [19]
Sobey et al.

[11] Patent Number: 5,272,713
[45] Date of Patent: Dec. 21, 1993

[54] HIGH REPETITION RATE PULSED LASER

[75] Inventors: Mark S. Sobey, San Carlos; Bertram C. Johnson, Sunnyvale; Glen R. Blevins, San Jose, all of Calif.

[73] Assignee: Spectra-Physics Lasers, Inc., Mountain View, Calif.

[21] Appl. No.: 937,358

[22] Filed: Aug. 27, 1992

[51] Int. Cl.⁵ .............................................. H01S 3/09
[52] U.S. Cl. ........................................ 372/69; 372/97; 372/105; 372/68; 372/25
[58] Field of Search ............... 372/97, 69, 68, 10, 29, 372/25, 105

[56] References Cited
U.S. PATENT DOCUMENTS
4,965,805 10/1990 Hayes ................................. 372/29

Primary Examiner—Leon Scott, Jr.
Attorney, Agent, or Firm—Fliesler, Dubb, Meyer and Lovejoy

[57] ABSTRACT

A pulsed laser system capable of operating at higher repetition rates, while maintaining the efficiency and beam quality of the output pulses comprises first and second gain media with one or more pump energy transducers, such as flashlamps, coupled with each of the gain media. A power supply generates a first sequence of pulses of input power and a second sequence of pulses of input power which drive respective subsets of the pump energy transducers in an independent timing relationship. Thus, two non-aligned 50 Hz sequences of input pulses which are interleaved generate an output pulse stream at 100 Hz from the laser system with the efficiency, beam quality, and average power comparable to that of a 50 Hz laser. By pumping subsets of the pump energy transducers coupled to a laser system in an interleaved fashion, higher repetition rates may be achieved with better output beam quality and higher average power than has been obtainable with prior art systems. The non-aligned timing also allows for variable pulse timing offsets.

52 Claims, 6 Drawing Sheets

HIGH REPETITION RATE PULSED LASER

BACKGROUND OF THE INVENTION

1. Field of the Invention

The present invention relates to pulsed laser systems, and more particularly to solid state laser systems for generating high power laser pulses at relatively high repetition rates with good beam quality.

2. Description of Related Art

High powered pulsed lasers that generate high quality output beams are being used in a variety of applications. A typical prior art system is offered by Spectra-Physics Lasers, Inc., under model number GCR-4-50. The GCR-4-50 is typical of the higher repetition rate systems. It includes two neodymium doped YAG rods in series within a resonant cavity. The two YAG rods are mounted in respective dual-ellipse pump cavities having two flashlamps each. The system is operated at about 50 Hz by simultaneously pumping all four flashlamps. The input pulse energy in each of the two pump chambers at 50 Hz is typically around 50 lamp joules, or 5 kW input ($2 \times 50$ Hz $\times 50$ joules). Specified output energy is 700 millijoules per pulse for 35 W average output power with 50 pulses per second, at 1064 nm in a high quality 70% Gaussian fit beam profile. Total laser output power to lamp input power efficiency is greater than 0.65% near 0.70%.

Many applications require a repetition rate of higher than 50 Hz. However, as the repetition rate for pumping the flashlamps increases, the average power and beam quality decrease dramatically. For instance, in an experiment using a GCR-4-50 at 100 Hz, the input pulse energy in each of the two pump chambers at 100 Hz was halved to 25 lamp joules thus maintaining 5 kW input power ($2 \times 100$ Hz $\times 25$ joules). Average output power in this 100 Hz configuration fell off about 70% from the 50 Hz system. In a GCR-4-50 system configured for 700 millijoules per pulse at 50 Hz, the 100 Hz pumping at 5 kW input power would therefore yield about 105 millijoules per pulse for 10.5 W average output power, and output power to lamp input power efficiency of about 0.21%.

Thus, prior art systems have been unable to achieve high powers with consistent beam quality with higher repetition rates. Accordingly, it is desirable to provide a laser system design capable of operating at higher pulse rates, while maintaining high efficiency and high quality output beams.

SUMMARY OF THE INVENTION

The present invention provides a pulsed laser system capable of operating at higher repetition rates, while maintaining efficiency and beam quality of the output pulses.

The system of the present invention can be characterized as comprising at least one pair of gain media, such as rods of Nd:YAG, with at least one pump energy transducer, such as a flashlamp, laser diode, or laser diode array, coupled with each of the gain media in the pair. Each gain media pair may be configured in an oscillator or amplifier system. The pump energy transducers are organized in subsets having at least one member each, which may be driven independently of one another. Each subset of pump energy transducers is fired in a non-aligned timing relationship and the time between firing of the subsets can be varied.

In one aspect of the invention, a power supply generates pulses of input power according to a first sequence and according to a second sequence which drive respective subsets of the pump energy transducers coupled to the pair of gain media in a staggered timing relationship. Thus, two interleaved sequences of input pulses having a controlled offset generate an output pulse stream from the laser system at twice the pulse rate of each of the sequences of input pulses.

In another aspect, the present invention utilizes substantially similar gain media such as rods of Nd:YAG which exhibit thermal lensing and/or thermally induced birefringence in response to heating by the pump energy sources. In such system, a rotator is placed between the gain media, so that effects of thermally induced birefringence on the beam in the first gain medium are compensated for by the effects in the second gain medium. The timing of the input pulse sequences and the lamp energy per pulse settings are selected in a manner which maintains the average input power to each of the gain media substantially similar. In this way, the thermally induced effects in both gain media are substantially the same. Therefore, using this technique, it is possible to operate each of the two pump chambers at 50 Hz independently and obtain 100 Hz laser output, with the associated thermal birefringence and lensing of a 50 Hz laser. This is critical to maintain high efficiency, high average power, and good spatial mode.

The present invention is extendable to a variety of configurations of gain media and of pump energy transducers. Thus, it may be generalized for the laser system including a pair of gain media with more than one pump energy transducer per gain medium, such that the first sequence of input pulses drives a first subset of pump energy transducers and a second sequence of pulses of input power drives a second subset of pump energy transducers. In one pumping configuration termed a diagonal interleaf, the first subset of pump energy transducers driven by the first sequence of pump energy pulses includes a pump energy transducer coupled to the first gain medium in the pair and a pump energy transducer coupled to the second gain medium in the pair, while the second subset of pump energy transducers driven by the second sequence of pulses includes a pump energy transducer coupled to the first gain medium in the pair and a pump energy transducer coupled to the second gain medium in the pair.

In an alternative pumping configuration termed a parallel interleaf, the first subset driven by the first sequence of pulses includes pump energy transducers coupled only to the first gain medium in the pair, and the second subset driven by the second sequence of pulses includes pump energy transducers coupled only to the second gain medium in the pair.

In a system which includes N pump energy transducers per gain medium, the power supply may generate N sequences of input pulses equally spaced in time. The input pulses in each sequence $S_i$ may be spaced in time by a period $\Delta T$ at an input pulse repetition rate of $1/\Delta T$. The pulses in sequence $S_i$ for $i = 1$ through $N-1$, occur at about $i\Delta T/N$ after pulses in the first sequence $S_o$. Thus, in a system including two sequences and two subsets of pump energy transducers, the laser output pulses can be generated at twice the input pulse repetition rate with half the period. In a system including three sequences, and three subsets of pump energy transducers, the laser output pulses can be generated at three-times the input pulse repetition rate, etc.

In alternative systems, the output pulses may not be equally spaced in time. For instance, a system may be configured so that a sequence of pairs of output pulses is generated in response to a first sequence of input pulses supplied at times jΔT, and a second sequence of input pulses supplied at times jΔT+t, where t is less than ΔT.

The present invention is extendable to systems involving a plurality of pairs of gain media. For instance, one pair of gain media may be configured within a resonant cavity to operate as a laser oscillator, and a second pair may be configured outside a resonant cavity to operate as a laser amplifier.

It is found that by pumping subsets of the pump energy transducers coupled to a laser system in a staggered or interleaved fashion, higher repetition rates may be achieved with better output beam quality and higher efficiency, while limiting thermal effects, like thermal birefringence, to levels associated with lower repetition rates.

Other aspects and advantages of the present invention can be seen upon review of the figures, the detailed description, and the claims which follow.

DETAILED DESCRIPTION OF THE PREFERRED EMBODIMENTS

A detailed description of preferred embodiments of the present invention is provided with respect to FIGS. 1-8.

Figure 1:
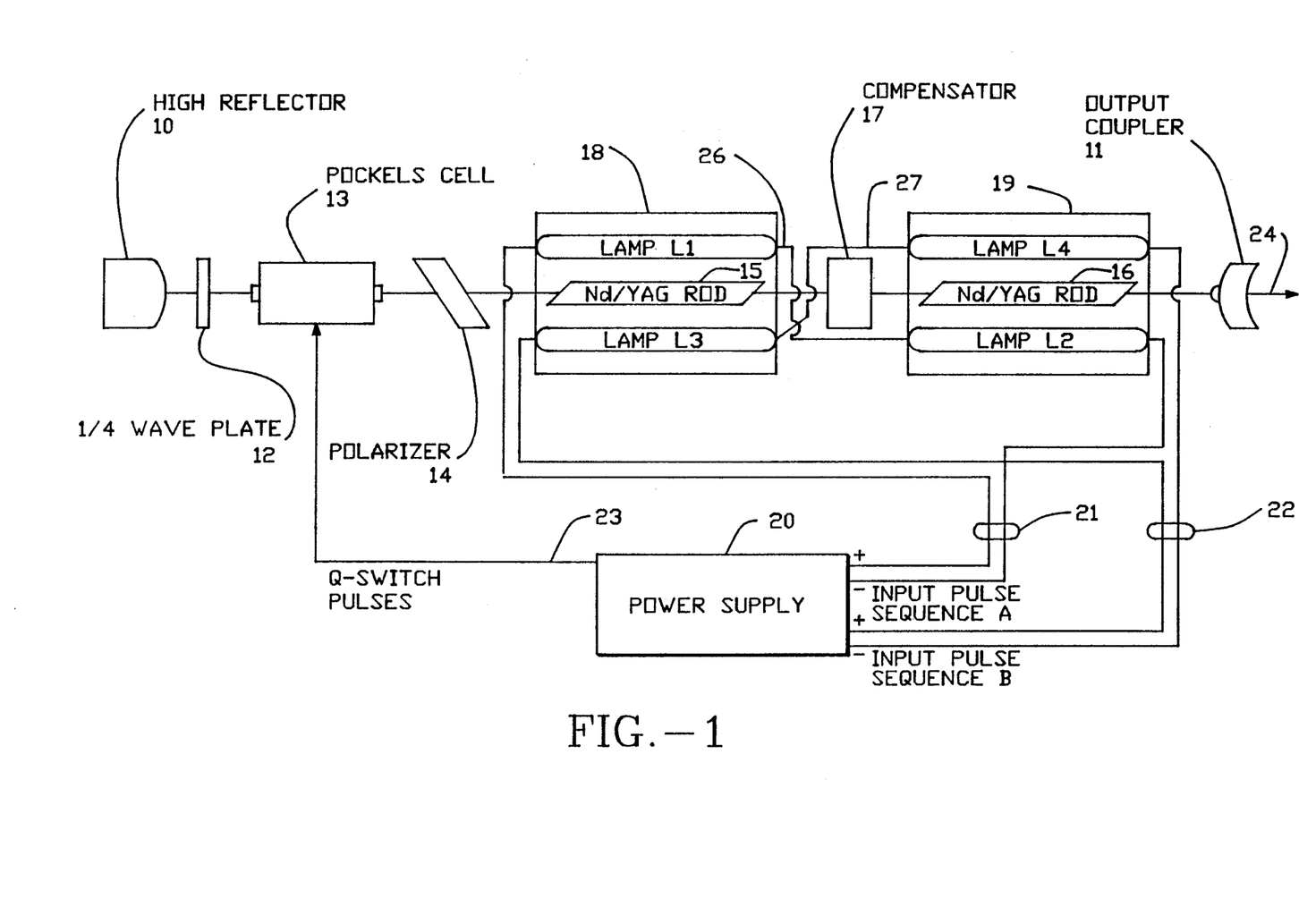
FIG. 1 is a schematic diagram of a laser system according to a preferred embodiment of the present invention.

FIG. 1 illustrates a preferred embodiment of the present invention. The system includes a resonant cavity defined by high reflector 10 and output coupler 11, which are configured in an unstable resonator design. A Q-switch comprised of a quarter wave plate 12, a pockels cell 13, and a polarizer 14 is included in the resonant cavity. A first gain medium 15 and a second gain medium 16 each of which consists of a substantially similar rod of Nd:YAG are placed in series in the resonant cavity. A compensator 17 is placed between the gain media 15, 16. See, for example, U.S. Pat. No. 3,484,714. The compensator 17 consists of a 90° rotator so that effects on polarization caused by the first rod 15 are compensated for by effects on polarization caused by the second rod 16. Each of the gain media 15, 16 is mounted in a dual ellipse pump cavity 18, 19, each of which include two lamps. Pump cavity 18 encloses rod 15 and includes lamps L1 and L3. Pump cavity 19 encloses rod 16 and includes lamps L4 and L2.

The components of one tested system in the configuration of FIG. 1 were the same as those used in the Spectra-Physics model GCR-4-50, which is commercially available from Spectra-Physics Lasers, Inc., Mountain View, Calif., using 8.5 mm diameter by 2 inches long Nd:YAG rods.

According to the present invention, a power supply 20 is included which generates a plurality of input pulse sequences. For the system shown, an input pulse sequence A is generated on lines 21 for driving lamp L1 in cavity 18 and lamp L2 in cavity 19 which are connected in series across line 26. Input pulse sequence B is generated on lines 22 for driving the lamp L3 in cavity 18 and lamp L4 in cavity 19, which are connected in series across line 27.

The Q-switch pulses are supplied on line 23 to the pockels cell 13 such that one pulse occurs for each input pulse in sequence A and each input pulse in sequence B.

FIG. 1 illustrates a "diagonal" interleaf, in which the first and third flashlamps L1 and L3 are mounted on opposing sides of rod 15; and the fourth and second flashlamps L4 and L2 are mounted on opposing sides of rod 16. Lamp L1 and L4 are on substantially a first side of the gain media 15, 16, and lamps L3 and L2 are on substantially a second side. In the "diagonal" interleaf configuration shown, lamp L1 and lamp L2, driven by input pulse sequence A, lie on opposite sides of the respective gain media and lamps L3 and L4 driven by input pulse sequence B lie on opposite sides of the respective gain media for the purpose of output beam uniformity. In an alternative "series" interleaf system (not shown), lamps L1 in pump cavity 18 and L2 in pump cavity 19 are mounted on the first side, and lamps L3 in pump cavity 18 and L4 in pump cavity 19 are mounted on the second side.

Figure 2:
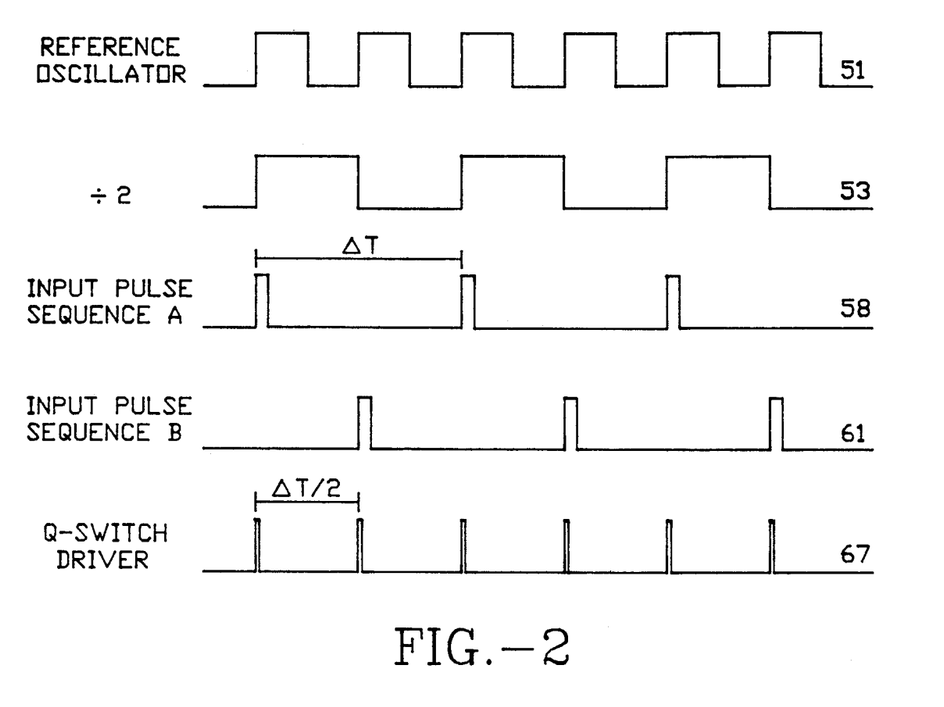
FIG. 2 is a timing diagram illustrating the input pulse sequences and the Q-switched driver sequence for the system of FIG. 1.

FIG. 2 is a timing diagram illustrating the operation of the power supply 20 in the system of FIG. 1. Input pulse sequence A and input pulse sequence B have a non-aligned, interleaved timing relationship. An output pulse is generated on path 24 on each firing of the Q-switch. Thus, on a first firing of the Q-switch, an input pulse from sequence A fires lamps L1 and L2 and results in generation of an output pulse on path 24. On the next firing of the Q-switch, an input pulse from sequence B results in firing of lamps L3 and L4 and the generation of an output pulse on path 24. It can be seen that the average power supplied to each gain medium 15, 16 is the same. Thus, the effects of thermally induced birefringence in the rods are balanced out by compensator 17.

Figure 3A:
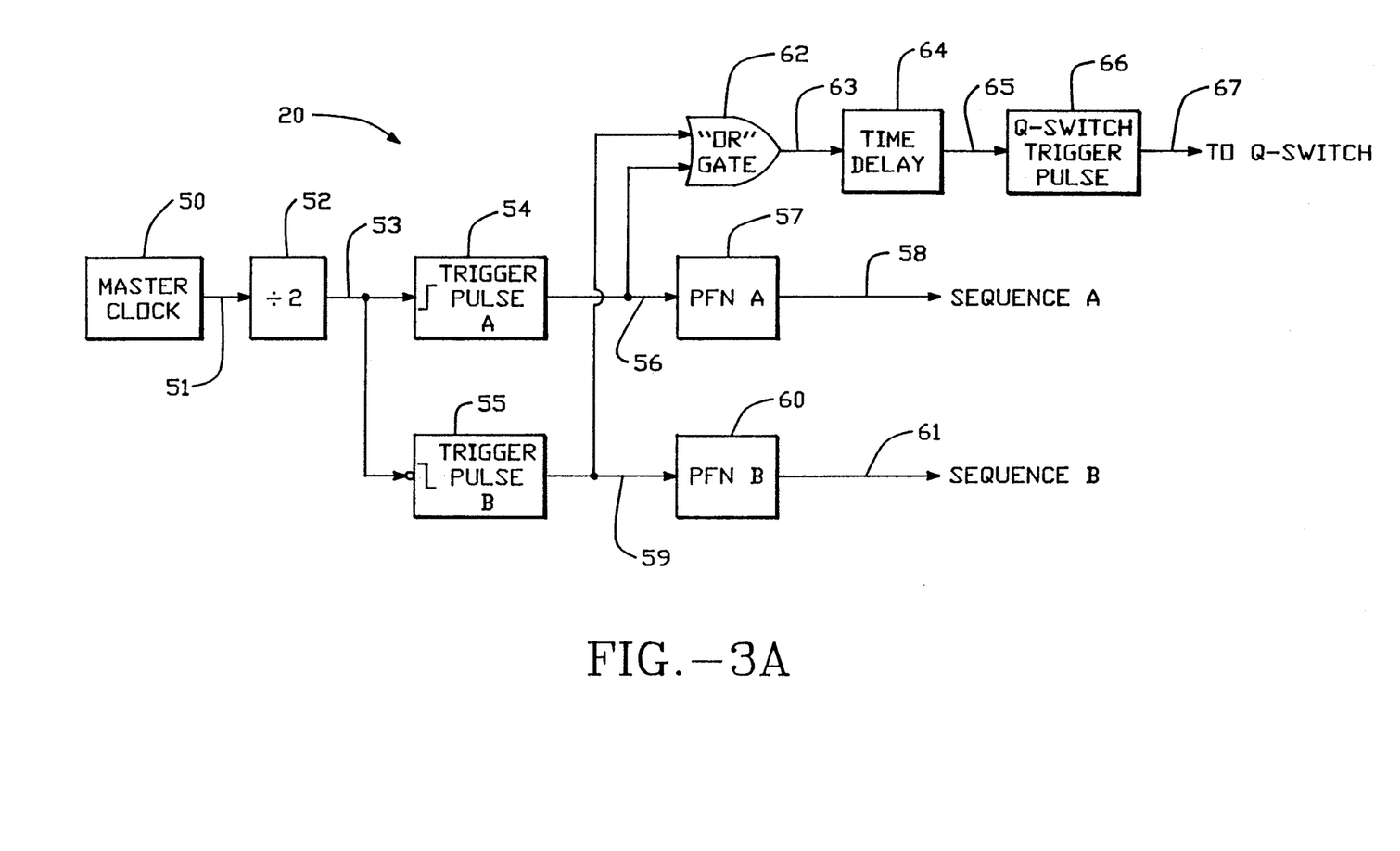
FIG. 3A is a schematic diagram of a power supply for use with the system of FIGS. 1 and 2.

FIG. 3A is a block diagram of the power supply 20 in the system of FIG. 1 as implemented for generating the sequences of FIG. 2B. Traces in FIG. 2 are labelled with the reference numbers of corresponding signal lines in FIG. 3A. Thus, the power supply 20 includes a master clock 50 operating at for instance 100 Hz, which supplies an output on line 51 to divide-by-2 circuit 52, such as a flip-flop. The divide-by-2 circuit 52 supplies a signal on line 53 to trigger pulse generator A 54 which is responsive to the positive going transition of the signal on line 53, and to trigger pulse generator B 55 which is responsive to the negative going transition of the signal on line 53. The trigger pulse generator A supplies a trigger pulse on line 56 for driving a pulse forming network A 57. The output of the pulse forming network A is sequence A on line 58 of input pulses.

Similarly, the trigger pulse generator B supplies trigger pulses on line 59 which drive a pulse forming network B 60 for generating sequence B on line 61. The outputs on lines 56 and 59 of trigger pulse generators A and B are supplied to OR gate 62. The output of OR gate on line 63 is supplied to timing delay circuit 64, and from there on line 66 to a Q-switch trigger pulse generator 66. The Q-switch trigger pulse generator 66 supplies a Q-switch trigger on line 67 to the Q-switch in a proper timing relationship with the pulses in sequences A and B.

The trigger pulse generator A 63 and trigger pulse generator B 64 may be implemented using monostable flip-flops which generate an output pulse with about a 20% duty cycle. The monostable flip-flop for trigger pulse generator A 63 is positive edge triggered and the monostable flip-flop for trigger pulses generator B 64 is negative edge triggered so that the sequence A and sequence B are 180° out of phase. The outputs of the monostable flip-flops are then supplied through respective isolation circuits such as an emitter follower driving an opto-coupler. The outputs of the opto-couplers are then supplied as the trigger pulse on lines 65 and 68, respectively to pulse forming networks.

The waveforms generated by the power supply of FIG. 3A are shown in FIG. 2. As can be seen, the output on line 51 of the reference oscillator is essentially a square wave along trace 51. The output of the divide by 2 circuit 61 is a square wave at half the frequency on trace 62. Input pulse sequence A is triggered on the positive going edge of the signal on line 62 while input pulse sequence B is triggered on the negative going edge of the signal on line 62. A Q-switch driver supplies a Q-switch pulse in time with the input pulses on both sequence A and sequence B.

Thus, there is a period $\Delta T$ between the input pulses in sequence A. The period between input pulses and sequence B is also $\Delta T$. The time between pulses of the Q-switch driver is $\Delta T/2$. Thus, for 20 milliseconds between pulses within sequence A and within sequence B, with a 10 millisecond offset, the Q-switch driver generates a pulse every 10 milliseconds. This results in an output pulse in time with the Q-switch driver pulses with a 10 millisecond spacing, or at 100 Hz.

In tests using a modified GCR-4-50 in the configuration of FIGS. 1-3A, driven with 5 kW at 50 lamp joules per input pulse in each of sequence A and sequence B, a 100 Hz output pulse sequence of approximately 350 millijoules per pulse is generated in the Q-switched embodiment for about 35 W of output power. This substantially matches the specified average output power for the GCR-4-50 operating at 50 Hz. For a long pulse test (without operating the Q-switch) and driving at 50 lamp joules per pulse in both sequences, a 100 Hz sequence of output pulses of approximately 265 millijoules per pulse was generated. As can be seen, the higher frequency output pulses have been achieved using the system of FIG. 1 without any loss in average power or efficiency. Furthermore, the beam quality has been maintained using the interleaved pumping scheme. The beam quality demonstrated greater than 70% correlation between actual beam profile and the best least squares fit gaussian profile in the near field.

This is to be compared with driving all lamps simultaneously at 100 Hz with the same average input power discussed in the background above, where the Q-switched average power output for 5 kW input was reduced by 70%.

The generation of pulses could be generalized to include N sequences, where pulses in each of the N sequences are spaced in time by a period $\Delta T$, and pulses in sequence $S_i$, for i=1 through N−1, occur at about $i\Delta T/N$ after pulses in a first sequence $S_o$. Alternatively, the timing between pulses could be irregular, and sequences generated having completely independent timing.

In addition, the energy per pulse can be independently controlled for each sequence, such that the output pulses may vary in intensity, so long as any thermal effects on pumping with variable input power are balanced out.

Figure 3B:
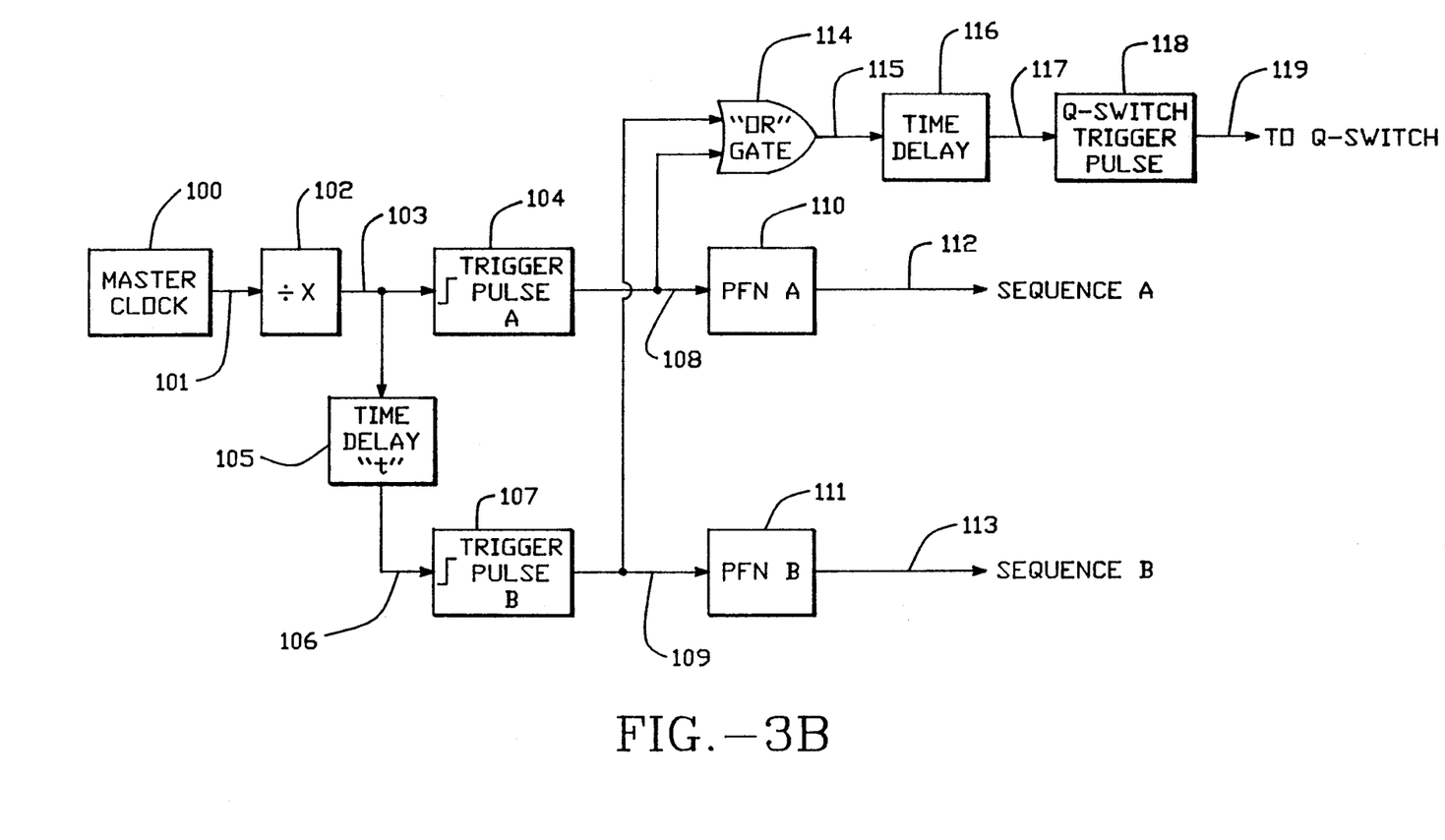
FIG. 3B is a schematic diagram of an alternative power supply for use with laser systems of the present invention.

FIG. 3B illustrates an alternative implementation of the power supply for generating non-aligned sequences of input pulses, having a controllable offset. Thus, the system of FIG. 3B includes a master clock 100, which generates an output on line 101. The output on line 101 is supplied to a divide-by-X circuit 102 which generates an output on line 103 having a desired frequency characteristic. The signal on line 103 is supplied to a trigger pulse generator A 104 and to a timing delay circuit 105 which is controllable by the user to delay the signal by an amount "t". The output of the timing delay circuit 105 is supplied as input to trigger pulse generator B 107. Trigger pulse generators A and B are both positive edge triggered in the embodiment of FIG. 3B. The outputs of trigger pulse generators A and B are supplied on lines 108 and 109, respectively, to respective pulse forming networks A 110 and B 111. Sequence A is supplied on line 112 from pulse forming network A, and sequence B is supplied on line 113 from pulse forming network B.

The outputs on lines 108 and 109 of the trigger pulse generators A and B are supplied as inputs to OR gate 114. The output of OR gate 114 on line 115 is supplied to a timing delay circuit 116, and from there on line 117 as input to Q-switch trigger pulse generator 118. The Q-switch trigger pulses are supplied on line 119 to the Q-switch.

Figure 4:
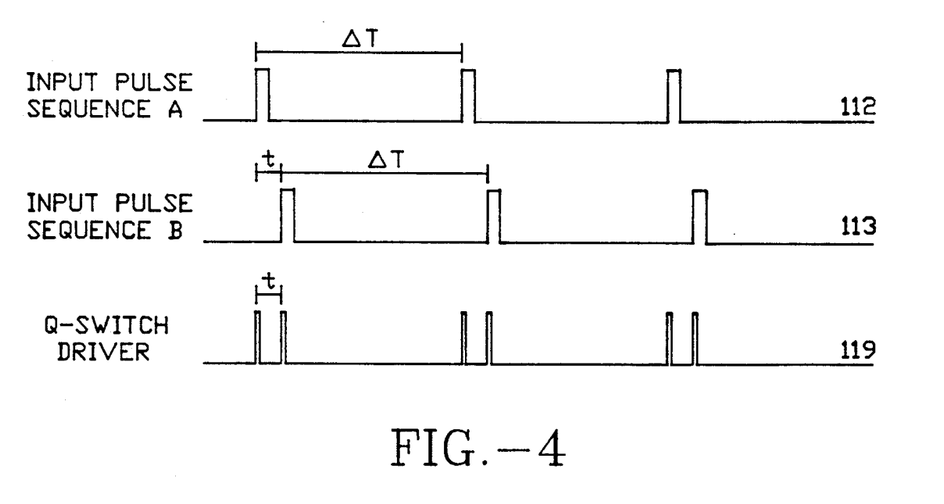
FIG. 4 is a timing diagram for an alternative pulse sequence according to the present invention such as may be produced using the power supply of FIG. 3B.

FIG. 4 illustrates an alternative timing sequence for generating pulse pairs using a power supply such as that shown in FIG. 3B. In the sequence of FIG. 4, input pulse sequence A has a period of $\Delta T$. Input pulse sequence B also has a period of $\Delta T$, but the pulses are offset by an amount t, such as may be set by delay circuit 105, after the pulses in sequence A. Thus, for pulses occurring at times $j\Delta T$ in sequence A, the pulses in sequence B occur in $j\Delta T+t$. The Q-switch driver is driven with pulse pairs synchronized with the input pulse sequences A and B with the time between pulses within each pair of t and a period between pulse pairs of $\Delta T$.

The power supply can be modified using well known techniques to generate a wide variety of timing sequences, with or without user control. For instance, pulse timing could be microprocessor controlled. A user may require more than one pulse forming network per input sequence (see FIGS. 7 and 8 below). Also, a power supply with a single pulse forming network could be used, with an appropriate switching circuit between the pulse forming network and the transducers, to supply the independent input pulse sequences.

Furthermore, the system can be extended by including more than two lamps per gain medium. For instance, with a system having three lamps per gain medium, three input pulse sequences could be generated in a variety of timing relationships, the simplest being three times the base repetition rate.

For gain media which exhibit thermal effects due to pump energy, it is desirable that the input pulse sequences be configured in time and energy per pulse so that the average pump power delivered to each gain medium is the same, and so that the thermal effects occurring in each gain medium remain substantially constant for each of the input pulses.

In a system such as that described in FIG. 1, where the gain medium is Nd:YAG, the gain medium exhibits thermally induced birefringence and thermal lensing in response to pump energy. It is important to balance the thermal effects in each of the rods so that thermal lensing does not unduly affect the laser threshold and cause other harmful effects on the beam. Similarly, it is important that the thermal effects be balanced so that the compensator 17 will properly cause offsetting of the polarization effects of birefringence in each of the rods.

In alternative systems, other gain media may be used, such as Nd:YLF or Ti:Sapphire, which do not exhibit thermally induced birefringence. In such systems, the compensator 17 may be omitted. Also, only one gain medium may be needed within the resonant cavity.

Figure 5:
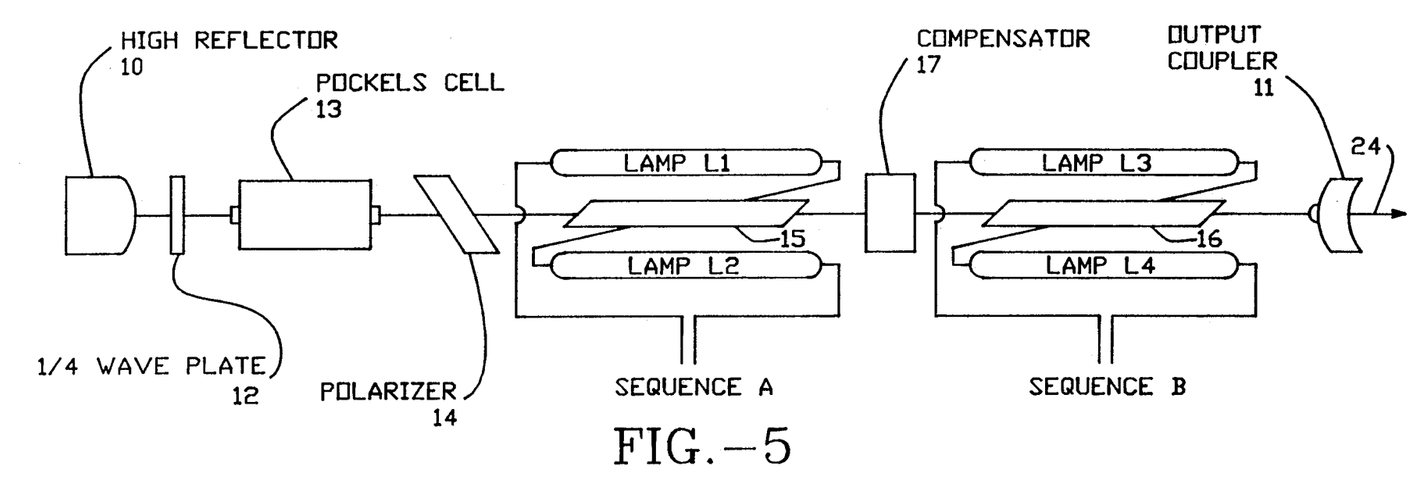
FIG. 5 is a schematic diagram of an alternative laser design according to the present invention using two gain media and four flashlamps configured so that one gain medium at a time receives a pulse of pump energy.

FIGS. 5-8 illustrate representative alternative configurations of the system of the present invention. In the system of FIG. 5, the components are given the same reference numbers as those in FIG. 1. However, the power supply and pump cavities are not shown for simplicity. FIG. 5 illustrates a "parallel" interleaf configuration which differs from the "diagonal" interleaf in FIG. 1 in the configuration of the lamps L1 through L4. Series connected lamps L1 and L2, which are driven according to input pulse sequence A are both coupled with rod 15 in FIG. 5. Similarly, series connected lamps L3 and L4, which are driven by input pulse sequence B, are both coupled to rod 16. In this manner, rod 15 is pumped by input pulse sequence A, while rod 16 is pumped by input pulse sequence B. The thermal effects of pumping the two rods are balanced because of the repetition rate is sufficiently high that the thermal effects do not relax between input pulses. It is found that the configuration of FIG. 5 operates almost as well as the configuration of FIG. 1. Tests of a modified GCR-4-50 show that the output pulses generated on line 24 in the configuration of FIG. 5 with 50 lamp joules per pulse in each sequence resulted in Q-switched pulses at 100 Hz with approximately 25% decrease in average power over the conventional 50 Hz system. This remains substantially greater than the 100 Hz simultaneous pumping mode with the same average input power as described above which suffered a 70% decrease.

Figure 6:
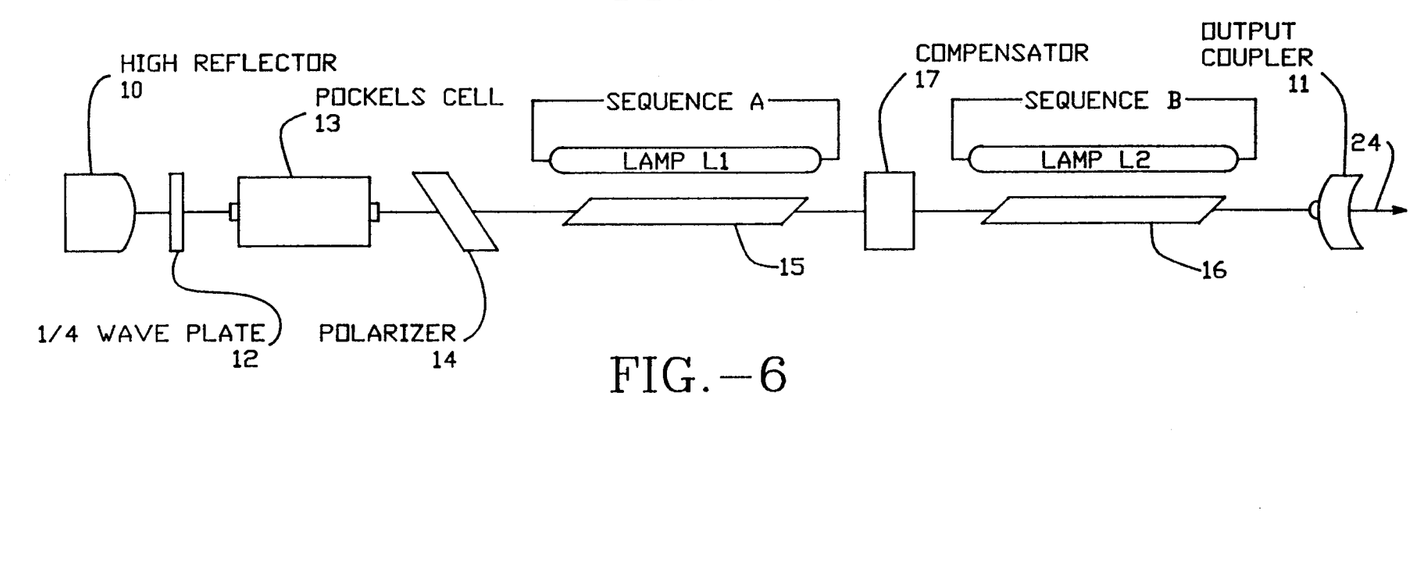
FIG. 6 is a schematic diagram of an alternative laser system according to the present invention with one flashlamp per gain medium.

FIG. 6 illustrates yet an alternative embodiment of the present invention in which there is a single lamp per pump cavity. Thus, the system includes high reflector 10 and output coupler 11 defining a resonant cavity. A Q-switch, consisting of quarter wave plate 12, pockels cell 13, and polarizer 14, is included in the resonant cavity. A first rod 15 and a second rod 16 are mounted in series within the resonant cavity with a compensator 17 mounted therebetween. A single lamp L1 is coupled with rod 15 and a single lamp L2 is coupled with rod 16. The lamp L1 is pumped with input sequence A and the lamp L2 is pumped with input sequence B.

Figure 7:
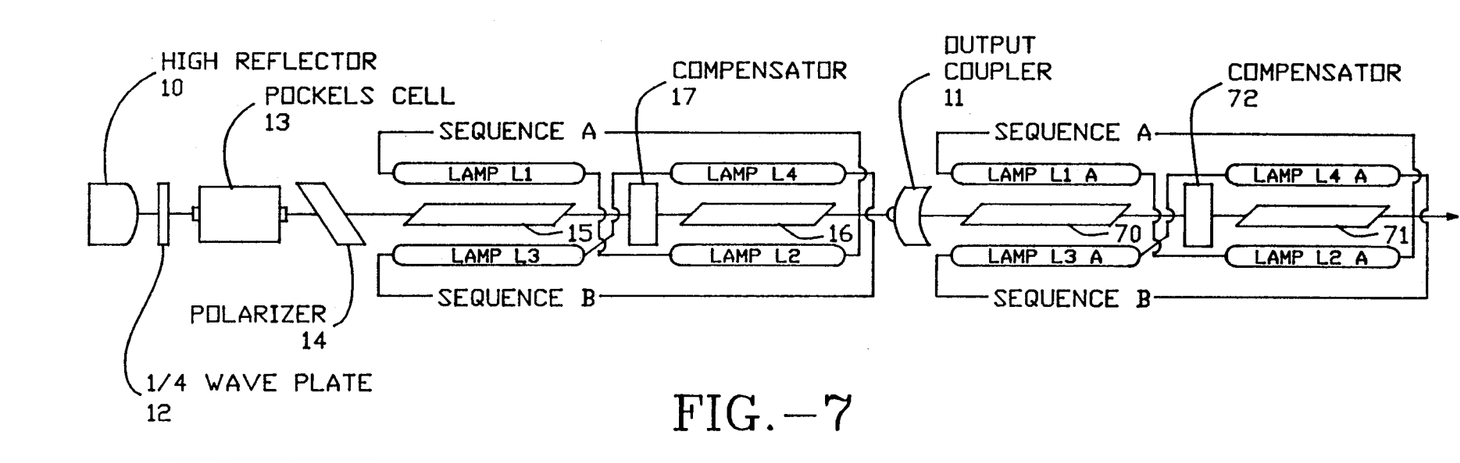
FIG. 7 is a schematic diagram of yet an alternative system according to the present invention including a first pair of gain media with two lamps each in a laser oscillator configuration, and a second pair of gain media with two lamps each in a laser amplifier configuration.

FIG. 7 illustrates yet another alternative of the present invention where it has been extended to a plurality of pairs of gain media in which at least one is mounted within the laser resonant cavity. Thus, the laser resonant cavity consists of high reflector 10 and output coupler 11 with a Q-switch consisting of quarter wave plate 12, pockels cell 13, and polarizer 14. A first rod pair 15, 16 is included within the resonant cavity with a compensator 17 mounted therebetween. A second rod pair 70, 71 is mounted outside the resonant cavity in an amplifier configuration with a compensator 72 mounted therebetween. Each of the rods 15, 16, 70, 71 is mounted within a two lamp pump cavity. The lamps are configured similarly to that shown in FIG. 1. Lamp L1 coupled with gain medium 15 in series with lamp L2 coupled with gain medium 16, and lamp L1A coupled with gain medium 71 in the amplifier in series with lamp L2A coupled with gain medium 71 in the amplifier are all pumped according to sequence A by two synchronized pulse forming networks. Series connected lamps L3 and L4 coupled with rods 15 and 16, respectively, and series connected lamps L3A and L4A, coupled with rods 70 and 71, respectively, are pumped in accordance with sequence B by two synchronized pulse forming networks.

Figure 8:
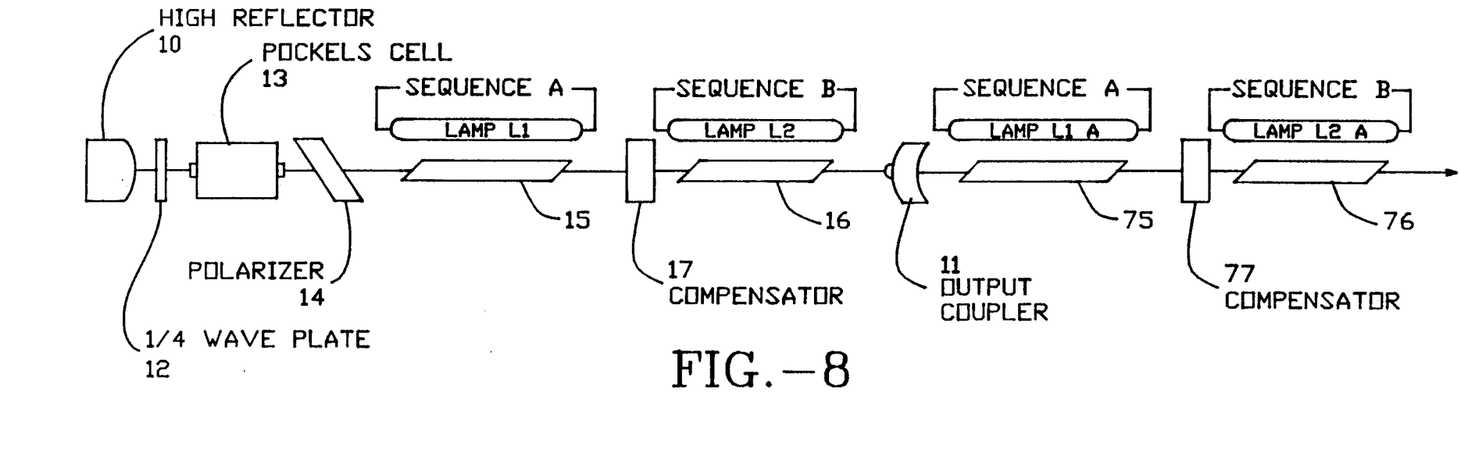
FIG. 8 is a schematic diagram of yet another alternative embodiment of the present invention having two gain media with one flashlamp each in a laser oscillator configuration, and two gain media with one flashlamp each in a laser amplifier configuration.

FIG. 8 illustrates yet another alternative embodiment of the present invention. FIG. 8 is configured like FIG. 7, except that it includes a single lamp per gain medium. Thus, a resonator is defined by high reflector 10 and output coupler 11. A Q-switch consisting of quarter wave plate 12, pockels cell 13, and polarizer 14 is mounted in the resonant cavity. A first rod 15 and a second rod 16 are mounted on opposite sides of compensator 17. Lamp L1 and lamp L2 are coupled with rods 15 and 16, respectively. Rods 75 and 76 are mounted in an amplifier configuration outside the resonant cavity with compensator 77 mounted therebetween. Lamps L1A and L2A are coupled with rods 75 and 76, respectively. Lamps L1 and L1A are pumped according to sequence A, while lamps L2 and L2A are pumped according to sequence B.

As can be seen, the present invention is extendable to any number of pairs of rods in oscillator/amplifier configurations. There can be more than one pair of rods within the resonant cavity, and/or more than one pair of rods outside the resonant cavity in amplifier configurations.

The pulsed laser system, according to this aspect of the present invention, can be characterized as a plurality of pairs of first and second gain media. A laser resonant cavity includes an output coupler for extracting the output pulses from the resonant cavity and defines a resonant optical path through at least one pair of gain media. Each pair of gain media is coupled with a set of pump energy transducers, where each set includes at least one transducer coupled to each gain medium in the pair. The power supply generates a plurality of sequences of pulses of input power which may independently drive corresponding subsets of the sets of pump energy transducers in non-aligned timing relationships. The subsets of transducers for each gain medium pair are configured in a substantially similar manner so that the given sequence of input pulses drives a similar subset in each pair of gain media.

Using non-aligned timing relationships for pumping subsets of pump energy transducers, a sequence of output pulses at a higher repetition rate can be achieved with higher beam quality and greater efficiency than prior art systems. Furthermore, the timing relationship between output pulses can be configured into output pulse pairs or other patterns of output pulses as suits the needs of a particular application.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A pulsed laser system, comprising:
   a first gain medium;
   a second gain medium;
   a laser resonant cavity including an output coupler for extracting output pulses from the resonant cavity, and defining a resonant optical path through the first and second gain media;
   a first pump energy transducer coupled to the first gain medium to supply pump energy to the first gain medium in response to input power;
   a second pump energy transducer coupled to the second gain medium to supply pump energy to the second gain medium in response to input power; and
   means, coupled with the first and second pump energy transducers, for supplying pulses of input power according to a first sequence to drive the first pump energy transducer and according to a second sequence to drive the second pump energy transducer, wherein the first and second sequences have a non-aligned timing relationship.

2. The pulsed laser system of claim 1, wherein the first and second sequences are interleaved.

3. The pulsed laser system of claim 1, wherein pulses in the first sequence are spaced in time by a period $\Delta T$, and pulses in the second sequence occur at about $\Delta T/2$ after pulses in the first sequence.

4. The pulsed laser system of claim 1, wherein the pulses in the first sequence are supplied at times $j\Delta T$, and the pulses in the second sequence are supplied at times $j\Delta T + t$, wherein t is less than $\Delta T$, so that a sequence of pairs of laser output pulses spaced in time by t, is generated, where j is an index from 2–N, and N is a number of pairs of laser output pulses in the sequence.

5. The pulsed laser system of claim 1, further including:
   means, between the first and second gain media, for rotating polarization so that effects on polarization in the second gain medium compensate for polarization effects in the first gain medium.

6. The pulsed laser system of claim 1, wherein the first and second gain media are substantially similar solid state gain media.

7. The pulsed laser system of claim 1, wherein the first and second gain media are substantially similar, and comprise respective pieces of solid state gain material each producing thermal lensing in response to heating by pump energy.

8. The pulsed laser system of claim 1, wherein the first and second gain media are substantially similar and comprise respective pieces of solid state gain material each producing thermally induced birefringence in response to heating by pump energy, and further including:
   means, between the first and second gain media, for rotating polarization so that thermally induced birefringence in the second gain medium compensates for thermally induced birefringence in the first gain medium.

9. The pulsed laser system of claim 1, wherein the first and second pump energy transducers comprise first and second flash lamps, respectively.

10. The pulsed laser system of claim 1, wherein the first and second pump energy transducers comprise laser diodes.

11. The pulsed laser system of claim 1, wherein the first and second gain media comprise substantially similar rods of neodymium doped YAG.

12. The pulsed laser system of claim 1, further including:
   a third gain medium;
   a fourth gain medium;
   a third pump energy transducer coupled to the third gain medium to supply pump energy to the third gain medium in response to input power;
   a fourth pump energy transducer coupled to the fourth gain medium to supply pump energy to the fourth gain medium in response to input power; and
   means, coupled with the means for supplying and the third and fourth pump energy transducers, for supplying pulses of input power to the third pump energy transducer according to the first sequence and to the fourth pump energy transducer according to the second sequence.

13. The pulsed laser system of claim 12, wherein the third and fourth gain media are within the resonant optical path.

14. The pulsed laser system of claim 12, wherein the third and fourth gain media are outside the resonant optical path.

15. The pulsed laser system of claim 1, further including:
   a Q-switch mounted in the resonant optical path; and
   means, coupled with the Q-switch, for driving the Q-switch in coordination with the first and second sequences of input power.

16. A pulsed laser system, comprising:
   a first gain medium;
   a second gain medium;
   a laser resonant cavity including an output coulper for extracting output pulses from the resonant cavity, and defining a resonant optical path through at least one of the first and second gain media;
   a first set of pump energy transducers coupled to the first gain medium to supply pump energy to the first gain medium in response to input power;
   a second set of pump energy transducers coupled to the second gain medium to supply pump energy to the second gain medium in response to input power; and means, coupled with the first and second pluralities of pump energy transducers, for supplying pulses of input power according to a plurality of sequences to drive a corresponding plurality of subsets of the first and second sets of pump energy transducers, wherein sequences in the plurality of sequences have a non-aligned timing relationship.

17. The pulsed laser system of claim 16, wherein the plurality of sequences of pulses of input power includes first and second interleaved sequences.

18. The pulsed laser system of claim 16, wherein the plurality of sequences of pulses of input power includes N sequences and the pulses in the N sequences are spaced in time by a period $\Delta T$, and pulses in the sequence $S_i$, for i equal to 1 to N−1, occur at about $i\Delta T/N$ after pulses in a first sequence $S_o$.

19. The pulsed laser system of claim 16, wherein the pulses of input power in a first sequence are supplied at times $j\Delta T$, and the pulses of input power in a second sequence are supplied at times $j\Delta T+t$, wherein t is less than $\Delta T$, so that a sequence of pairs of output pulses spaced in time by t, is generated, where j is an index from 10-N and N is a number of pairs of laser output pulses in the sequence.

20. The pulsed laser system of claim 16, further including:
means, between the first and second gain media, for rotating polarization so that effects on polarization in the second gain medium compensate for polarization effects in the first gain medium.

21. The pulsed laser system of claim 16, wherein the first and second gain media are substantially similar solid state gain media.

22. The pulsed laser system of claim 16, wherein the first and second gain media are substantially similar and comprise respective pieces of solid state gain material each producing thermal lensing in response to heating by pump energy.

23. The pulsed laser system of claim 16, wherein the first and second gain media are substantially similar and comprise respective pieces of solid state gain material each producing thermally induced birefringence in response to heating by pump energy, and further including:
means, between the first and second gain media, for rotating polarization so that thermally induced birefringence in the second gain medium compensates for thermally induced birefringence in the first gain medium.

24. The pulsed laser system of claim 16, wherein the pump energy transducers comprise flash lamps.

25. The pulsed laser system of claim 16, wherein the pump energy transducers comprise laser diodes.

26. The pulsed laser system of claim 16, wherein the plurality of sequences of pulses of input power include a first sequence to drive a first subset of pump energy transducers and a second sequence to drive a second subset of pump energy transducers, and wherein the first subset includes first and second pump energy transducers in the first set coupled to the first gain medium, and the second subset includes third and fourth pump energy transducers in the second set coupled to the second gain medium.

27. The pulsed laser system of claim 16, wherein the plurality of sequences of pulses of input power include a first sequence to drive a first subset of pump energy transducers and a second sequence to drive a second subset of pump energy transducers, and wherein the first subset includes a first pump energy transducer in the first set coupled to the first gain medium and a second pump energy transducer in the second set coupled to the second gain medium, and the second subset includes a third pump energy transducer in the first set coupled to the first gain medium and a fourth pump energy transducer in the second set coupled to the second gain medium.

28. The pulsed laser system of claim 16, wherein the first and third pump energy transducers are mounted on opposing sides of the first gain medium, and the second and fourth pump energy transducers are mounted on opposing sides of the second gain medium such that the first and fourth pump energy transducers are substantially on a first side and the second and third pump energy transducers of substantially on a second side of the respective first and second gain media.

29. The pulsed laser system of claim 16, wherein the first and second gain media comprise substantially similar rods of neodymium doped YAG.

30. The pulsed laser system of claim 16, further including:
a Q-switch mounted in the resonant optical path; and
means, coupled with the Q-switch, for driving the Q-switch in coordination with the plurality of sequences of pulses of input power.

31. A pulsed laser system, comprising:
a plurality of pairs of first and second gain media;
a laser resonant cavity including an output coupler for extracting output pulses from the resonant cavity, and defining a resonant optical path through at least one gain medium in the plurality of pairs;
a plurality of sets of pump energy transducers, each set in the plurality coupled to a corresponding pair of the plurality of pairs of gain media and including at least one pump energy transducer coupled with each of the first and second gain media in the corresponding pair; and
means, coupled with the plurality of sets of pump energy transducers, for supplying pulses of input power according to a plurality of sequences to drive a corresponding plurality of subsets of the sets of pump energy transducers, wherein sequences in the plurality of sequences have a non-aligned timing relationship.

32. The pulsed laser system of claim 31, wherein the plurality of sequences of pulses of input power includes first and second interleaved sequences to drive two subsets of each of the sets of pump energy transducers.

33. The pulsed laser system of claim 31, wherein the plurality of sequences of pulses of input power includes N sequences to drive N subsets of each of the sets of pump energy transducers, and the pulses in the N sequences are spaced in time by a period $\Delta T$, and pulses in the sequence $S_i$, for i equal to 1 to N−1, occur at about $i\Delta T/N$ after pulses in a first sequence $S_o$.

34. The pulsed laser system of claim 31, wherein the pulses of input power in a first sequence are supplied at times $j\Delta T$, and the pulses of input power in a second sequence are supplied at times $j\Delta T+t$, wherein t is less than $\Delta T$, so that a sequence of pairs of output pulses spaced in time by t, is generated, where j is an index from 1-N, and N is a number of pairs of laser output pulses in the sequence.

35. The pulsed laser system of claim 31, further including:
means, between the first and second gain media of at least one of the plurality of pairs, for rotating polarization so that effects on polarization in the second gain medium compensate for polarization effects in the first gain medium.

36. The pulsed laser system of claim 31, wherein the first and second gain media in each of the plurality of pairs are substantially similar solid state gain media.

37. The pulsed laser system of claim 31, wherein the first and second gain media in each pair in the plurality of pairs are substantially similar and comprise respective pieces of solid state gain material each producing thermal lensing in response to heating by pump energy.

38. The pulsed laser system of claim 31, wherein the first and second gain media in each pair in the plurality of pairs are substantially similar and comprise respective pieces of solid state gain material each producing thermally induced birefringence in response to heating by pump energy, and further including:
  means, between the first and second gain media in each pair, for rotating polarization so that thermally induced birefringence in the second gain medium compensates for thermally induced birefringence in the first gain medium.

39. The pulsed laser system of claim 31, wherein the pump energy transducers in at least one set in the plurality of sets comprise flash lamps.

40. The pulsed laser system of claim 31, wherein the pump energy transducers in at least one set in a plurality of sets comprise laser diodes.

41. The pulsed laser system of claim 31, wherein the plurality of sequences of pulses of input power include a first sequence to drive a first subset of pump energy transducers and a second sequence to drive a second subset of pump energy transducers in at least one of the sets, and wherein the first subset includes first and second pump energy transducers coupled to the first gain medium of the pair, and the second subset includes third and fourth pump energy transducers coupled to the second gain medium in the pair.

42. The pulsed laser system of claim 31, wherein the plurality of sequences of pulses of input power include a first sequence to drive a first subset of pump energy transducers and a second sequence to drive a second subset of pump energy transducers in at least one of the sets, and wherein the first subset includes a first pump energy transducer coupled to the first gain medium in the pair and a second pump energy transducer coupled to the second gain medium in the pair, and the second subset includes a third pump energy transducer coupled to the first gain medium in the pair and a fourth pump energy transducer coupled to the second gain medium in the pair.

43. The pulsed laser system of claim 42, wherein the first and third pump energy transducers are mounted on opposing sides of the first gain medium in the pair, and the second and fourth pump energy transducers are mounted on opposing sides of the second gain medium in the pair such that the first and fourth pump energy transducers are substantially on a first side and the second and third pump energy transducers of substantially on a second side of the respective first and second gain media.

44. The pulsed laser system of claim 31, wherein the first and second gain media in at least on pair in the plurality of pairs comprise substantially similar rods of neodymium doped YAG.

45. The pulsed laser system of claim 31, further including:
  a Q-switch mounted in the resonant optical path; and
  means, coupled with the Q-switch, for driving the Q-switch in coordination with the plurality of sequences of pulses of input power.

46. A pulsed laser system, comprising:
  a first solid state gain medium;
  a second solid state gain medium;
  a laser resonant cavity including an output coupler for extracting output pulses from the resonant cavity, and defining a resonant optical path through the first and second solid state gain media;
  means, between the first and second solid state gain media, for rotating polarization so that thermally induced birefringence in the first solid state gain medium compensates for thermally induced birefringence in the second solid state gain medium;
  a first pump cavity enclosing the first solid state gain medium, including a first set of flash lamps to supply pump energy to the first gain medium in response to input power;
  a second pump cavity enclosing the second solid state gain medium, including a second set of flash lamps to supply pump energy to the second gain medium in response to input power;
  means, coupled with the first and second sets of flash lamps, for supplying pulses of input power according to a plurality of sequences to drive a plurality of subsets of the first and second sets of flash lamps, wherein sequences in the plurality of sequences have a non-aligned timing relationship;
  a Q-switch mounted in the resonant optical path; and
  means, coupled with the Q-switch, for driving the Q-switch in coordination with the plurality of sequences of pulses of input power.

47. The pulsed laser system of claim 46, wherein the plurality of sequences of pulses of input power includes first and second interleaved sequences.

48. The pulsed laser system of claim 46, wherein the plurality of sequences of pulses of input power includes N sequences and the pulses in the N sequences are spaced in time by a period $\Delta T$, and pulses in the sequence $S_i$, for i equal to 1 to $N-1$, occur at about $i\Delta T/N$ after pulses in a first sequence $S_o$.

49. The pulsed laser system of claim 46, wherein the pulses of input power in a first sequence are supplied at times $j\Delta T$, and the pulses of input power in a second sequence are supplied at times $j\Delta T + t$, wherein t is less than $\Delta T$, so that a sequence of pairs of output pulses spaced in time by t, is generated, where j is an index from 1-N, and N is a number of pairs of laser output pulses in the sequence.

50. The pulsed laser system of claim 46, wherein the plurality of sequences of pulses of input power include a first sequence to drive a first subset of flash lamps and a second sequence to drive a second subset of flash lamps in first and second pluralities of flash lamps, and wherein the first subset includes first and second flash lamps in the first set coupled to the first gain medium, and the second subset includes third and fourth flash lamps in the second set coupled to the second gain medium.

51. The pulsed laser system of claim 46, wherein the plurality of sequences of pulses of input power include a first sequence to drive a first subset of flash lamps and a second sequence to drive a second subset of flash lamps in the first and second sets of flash lamps, and wherein the first subset includes a first flash lamp in the first set coupled to the first gain medium and a second flash lamp in the second set coupled to the second gain medium, and the second subset includes a third flash lamp in the first set coupled to the first gain medium and a fourth flash lamp in the second set coupled to the second gain medium.

52. The pulsed laser system of claim 51, wherein the first and third flash lamps are mounted on opposing sides of the first gain medium in the first pump cavity, and the second and fourth flash lamps are mounted on opposing sides of the second gain medium in the second pump cavity such that the first and fourth pump energy transducers are substantially on a first side and the second and third pump energy transducers of substantially on a second side of the respective first and second gain media.

* * * * *